April 5, 1960 M. H. GLAUBERMAN 2,932,006

SYMBOL RECOGNITION SYSTEM

Filed July 21, 1955 6 Sheets-Sheet 1

INVENTOR
MARVIN H. GLAUBERMAN

BY Joseph Weingarten
ATTORNEY

INVENTOR
MARVIN H. GLAUBERMAN
BY Joseph Weingarten
ATTORNEY

INVENTOR
MARVIN H. GLAUBERMAN

BY Joseph Weingarten
ATTORNEY

April 5, 1960 M. H. GLAUBERMAN 2,932,006

SYMBOL RECOGNITION SYSTEM

Filed July 21, 1955 6 Sheets-Sheet 4

INVENTOR
MARVIN H. GLAUBERMAN
BY Joseph Weingarten
ATTORNEY

| 1 SCAN | 2 TOTAL | 3 LONG | 4 CODE | 5 IDENTITY | 6 READ IN | 7 SHIFT | 8 INTERROGATE | 9 1st READ IN IN CORE ROW | 10 2nd READ IN IN CORE ROW | 11 3rd READ IN IN CORE ROW | 12 4th READ IN IN CORE ROW |
|---|---|---|---|---|---|---|---|---|---|---|---|
| 1 | 1 | 0 | 10 | NO | YES | YES | NO | 1 | — | — | — |
| 2 | 2 | 0 | 20 | NO | YES | YES | NO | 2 | 1 | — | — |
| 3 | 2 | 0 | 20 | YES | NO | NO | NO | 2 | 1 | — | — |
| 4 | 2 | 0 | 20 | YES | NO | NO | NO | 2 | 1 | — | — |
| 5 | 2 | 0 | 20 | YES | NO | NO | NO | 2 | 1 | — | — |
| 6 | 3 | 0 | 30' | NO | YES | YES | NO | 3 | 2 | 1 | — |
| 7 | 3 | 0 | 30' | YES | NO | NO | NO | 3 | 2 | 1 | — |
| 8 | 1 | 1 | 11 | NO | YES | YES | NO | 4 | 3 | 2 | 1 |
| 9 | 0 | 0 | — | NO | — | YES | NO | 5 | 4 | 3 | 2 |
| 10 | 0 | 0 | — | NO | — | YES | | 6 | 5 | 4 | 3 |
| 11 | 0 | 0 | — | NO | — | YES | NEXT SHIFT PULSE | 7 | 6 | 5 | 4 |
| 12 | 0 | 0 | — | NO | — | YES | YES | X | 7 | 6 | 5 |

FIG. 9

INVENTOR
MARVIN H. GLAUBERMAN

BY Joseph Weingarten
ATTORNEY

April 5, 1960 M. H. GLAUBERMAN 2,932,006

SYMBOL RECOGNITION SYSTEM

Filed July 21, 1955 6 Sheets-Sheet 6

INVENTOR
MARVIN H. GLAUBERMAN

BY Joseph Weingarten
ATTORNEY

United States Patent Office 2,932,006

Patented Apr. 5, 1960

2,932,006

SYMBOL RECOGNITION SYSTEM

Marvin H. Glauberman, Medfield, Mass., assignor to Laboratory for Electronics, Inc., Boston, Mass., a corporation of Delaware Application July 21, 1955, Serial No. 523,557

29 Claims. (Cl. 340—149)

This invention relates in general to symbol recognition apparatus and in particular to an electronic character reader which advantageously employs novel coding techniques to provide an output signal uniquely representative of a scanned character notwithstanding wide variations in character size, width, height, alignment, or printing imperfections. Recognition of a line of characters and the simultaneous provision of a corresponding provision of a corresponding train of representative electrical date signals may be reliably accomplished during a single pass at high speed. The utility of output signals of this nature should be at once evident; however, the apparatus controlled or operated thereby does not form part of the present invention.

Previous attempts to recognize and identify printed symbols by electronic means can be characterized by several basic restrictions which served to severely limit the usefulness of the apparatus. These are now listed, with an indication of the manner in which the present invention overcomes such disadvantages.

Prior systems have encountered difficulties with respect to registry, both horizontal and vertical; that is, the orientation of the symbol with respect to the scanning means. Such scanning means might be a mask cut out precisely as the symbol to be identified or in some manner to accentuate certain salient features common to a plurality of symbols. The number of symbols that can be so identified in a given unit of time is limited by the time required to align the symbol with the mask and the speed with which said mask can be moved. Also, the mask device precludes recognition of symbols, even of the same type face, when the height and/or width of the symbol is varied.

It is an object of the present invention to provide character recognition apparatus which in its performance is independent of vertical registry, independent of horizontal registry, independent of symbol height, independent of symbol width and not limited in speed by inertia associated with moving parts.

The quality of the printing of the symbol has previously also been a limiting factor in that jagged edges on the lead type slug leading to an ill-defined impression on the paper have confused recognition apparatus. It is an object to provide apparatus functioning in accordance with a logical program which eliminates the most common printing imperfections and minimizes others. The apparatus is also independent of the depth of the impression as well as the color of the print over a wide range.

The effect of background noise present on the printed document; for example, dirt, etc., appearing from handling, has always hampered recognition apparatus. Another object is to render the apparatus insensitive to dirt and other forms of particle interference by a filter technique present at the output of the scanner which serves both to reject noise and identify the incremental content of a scan and by noise rejection achieved in the basic logic of the apparatus.

Prior apparatus has been limited by the requirement that virtually all the information content of the symbol be committed to storage. This requirement generally manifests itself by the need for a very large number of scans of the symbol as well as retention of the time separation of events occurring within a scan.

A further object is to provide symbol recognition apparatus independent of the absolute time occurrence of events within a scan which achieves recognition of the symbol without the necessity of storing the contents of every scan.

It is an object of this invention to derive an output signal uniquely characteristic of an inscribed symbol then scanned suitable for actuating associated apparatus to utilize the information characterized in the symbol.

Still another object is to provide means for recognizing essential portions of a symbol and encoding said portions in a manner which uniquely characterizes the symbol.

Another object of the invention is to recognize symbols by examining portions of each symbol having shaded areas in each portion which may be classified into a plurality of groups, provide means for retaining the number of shaded areas of a group in a portion only when the segment previously scanned is different therefrom, and provide means for recognizing the symbol from the retained numbers.

An object of the invention is to provide means for rejecting the signal derived from scanning a predetermined number of segments of a symbol so as to minimize interpretation errors resulting from irregularly edged symbols.

Another object of the invention is to synchronize recognition operations with the scanning apparatus searching the symbol.

Another object of the invention is to provide apparatus for converting the shape of the symbol into a relatively simple coded signal uniquely characteristic of the scanned symbol.

Basically the present invention employs a novel method for identifying symbols which includes, examining portions of a symbol, each portion having contrasting media therein, each contrasting medium having a characteristic which identifies it as belonging to one of a predetermined plurality of groups, counting the number of contrasting media in each portion which fall into each group, retaining the count when the count in each group bears a predetermined relation to that of another portion or portions, and interpreting the retained counts.

For example, a particular method of uniquely characterizing inscribed symbols composed of light and dark areas includes scanning adjacent segments of the symbol to be recognized to provide a signal which facilitates counting the total number of dark areas and the number of relatively large dark areas in each segment, assigning a two-digit coded number characteristic of the aforesaid count, the first digit being the total number of dark areas and the second digit being the total number of relatively large dark areas, and retaining a coded number when it bears a predetermined relation to one or more coded numbers derived from scanning other segments, the sequence of coded numbers thereby formed being uniquely characteristic of the scanned symbol.

One form of apparatus for practicing this method includes means for sequentially scanning adjacent segments of a symbol to provide a signal characteristic of the light content of the segment, means for counting the total number of pulses derived from scanning dark areas in each segment and for counting the total number of pulses derived from scanning relatively large dark areas therein, to derive a coded signal related to a two-digit coded number characteristic of the total number of dark areas and relatively large dark areas in the scanned segment. The coded signal so derived is then compared with the coded signal derived from the preceding scan, which has been retained in a relatively short term storage device, and inserted into a relatively long term, temporary storage system only when differing therefrom. When a coded signal is inserted into the long term temporary storage system it advances the coded signal previously inserted therein. Insertion of a predetermined number of coded signals into long term storage arranges this store with a sequence of coded signals so that a terminal associated with the symbol then scanned is selected by an appropriate switching system to be energized by an output pulse in response to the excitation of the long term storage system with a readout pulse. The aforementioned switching system effectively includes a permanent storage system having stored therein a plurality of coded sequences corresponding to expected known symbols. Comparison of the sequence in temporary storage with that known sequence in permanent storage corresponding to the symbol then scanned results in energization of the appropriate terminal with an output pulse.

Fundamentally, the apparatus described below comprises scanning means for converting characteristics of the inscribed symbol to an electrical signal, an encoding unit which examines the scanner output signal for essential characteristics which are stored in accordance with a predetermined program, a final storage system wherein the data from the encoding unit may be moved about in a manner facilitating its interpretation, and interpreting means which samples the final store to identify the scanned symbol and provides a signal suitable for actuating apparatus which utilizes the information characterized by the scanned symbol.

In a specific embodiment described herein reference is made to apparatus which reads ordinary numerals, such as would appear on a bank check. This particular character reader is made up of four main component parts:

(*a*) *The photoelectric-delay line scanner.*—Used to convert the printed character to a series of electrical signals having a special significance to the encoding unit.

(*b*) *Encoding unit.*—Here the information derived from the scanner is tabulated, examined for certain characteristics, and put into storage in accordance with six specific instructions.

(*c*) *Shift register storage.*—The scanned, encoded data is compressed and moved about until the store signifies the character can be identified by the diode matrix.

(*d*) *Diode matrix.*—Samples the store and makes the identification. This unit has as many outputs as there are possible characters (10 outputs for the numerals zero through nine). The outputs can be used directly to operate a printer, a key punch, an accumulator, etc.

These and other objects and advantages will become apparent from the following specification read with reference to the accompanying drawing in which:

Fig. 1 is a pictorial representation of a photoelectric scanner;

Fig. 2 displays graphical representations of signal waveforms derived from the photoelectric cells when the numeral five is scanned;

Figure 7:
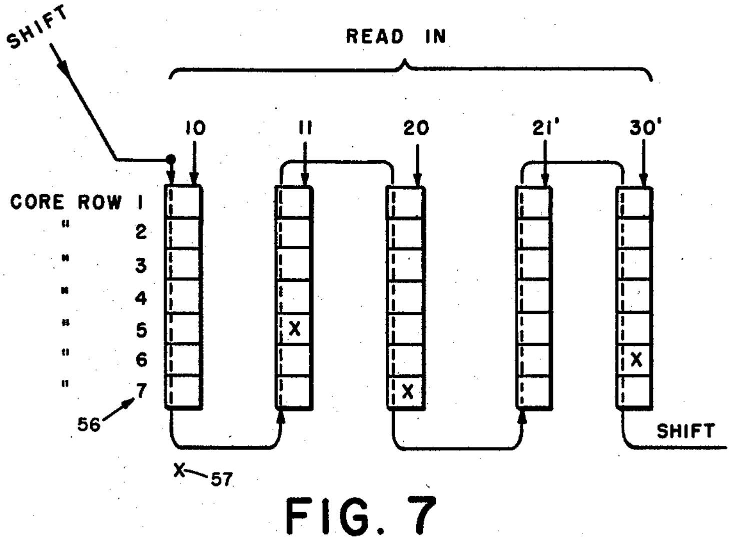
Figure 8:
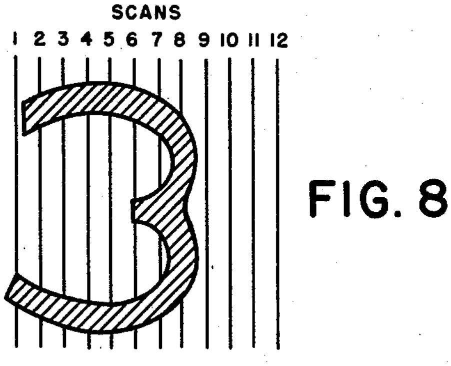
Figure 6:
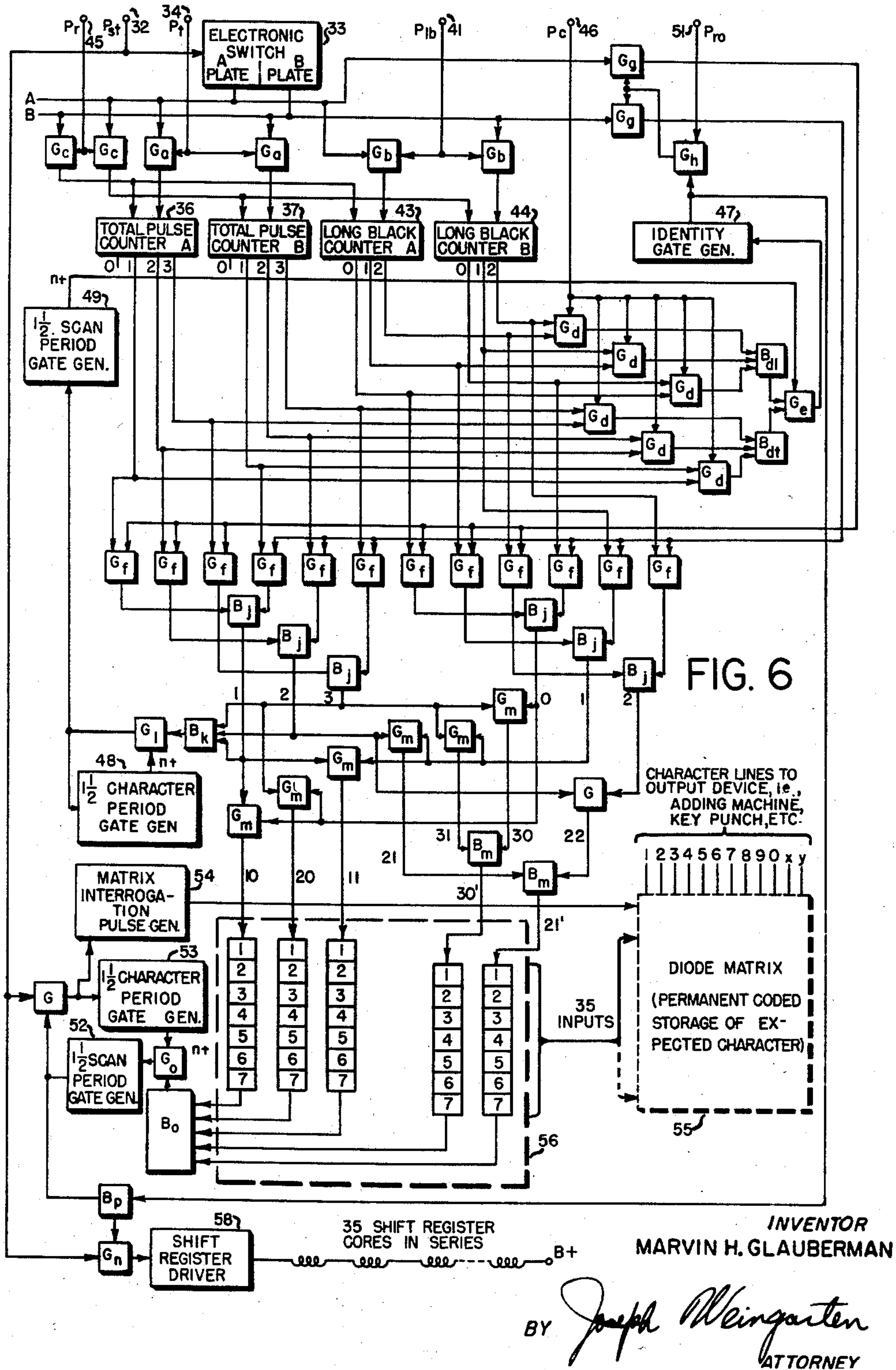
Figure 11:
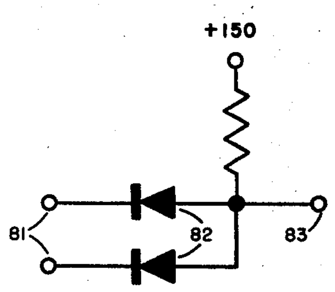
Figure 12:
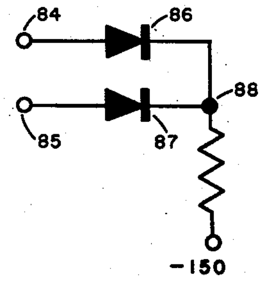
Figure 10:
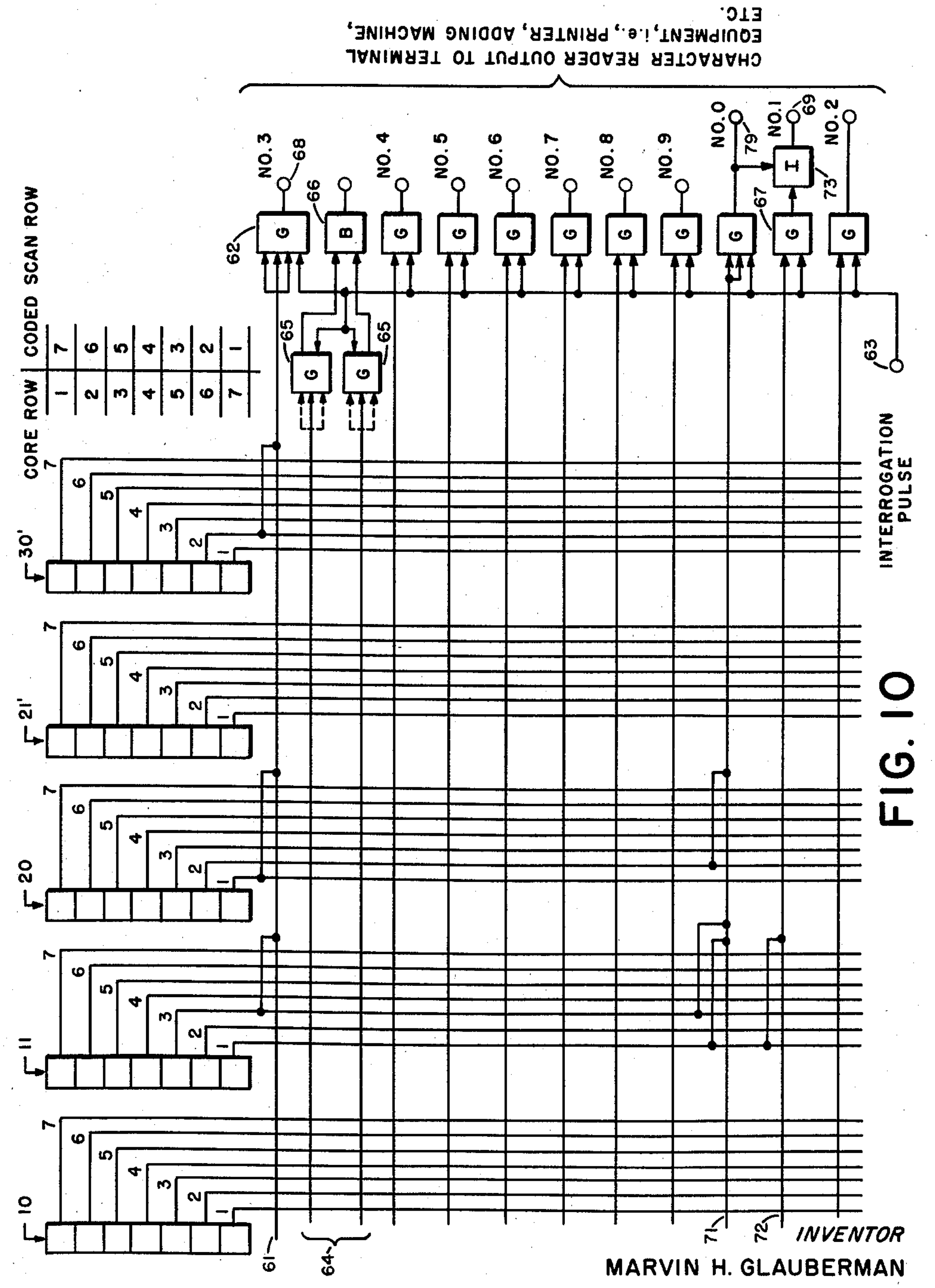

Fig. 6 includes a detailed block diagram of the encoding unit;

Fig. 7 is a detailed block diagram of a shift register storage system energized by the encoding unit;

Fig. 8 illustrates an example of the order in which the numeral three may be scanned;

Fig. 9 is a chart which explains the operation of the shift register of Fig. 7 as the numeral three is scanned in the sequence designated in Fig. 8;

Fig. 10 illustrates the connections from the shift register through a diode matrix which selects for energization that one of a plurality of terminals which corresponds to the scanned character stored in the shift register in coded form;

Fig. 11 is a typical gate circuit;

Fig. 12 is a typical buffer circuit; and

Figure 13:
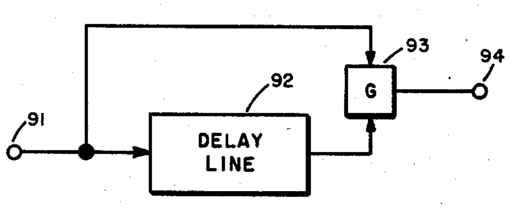

Fig. 13 illustrates an embodiment for detecting total pulses and long black pulses.

With reference now to the drawing, and more particularly to Fig. 1 thereof, a pictorial diagram of the novel photoelectric-delay line scanner is illustrated. It is apparent that conventional electrical or mechanical scanning means may be employed in association with apparatus which follows in the system; however, certain features, which will become evident from the description which follows, lend the scanner herein disclosed especially useful when inscribed symbols are to be interpreted.

Figures 1A, 1B:
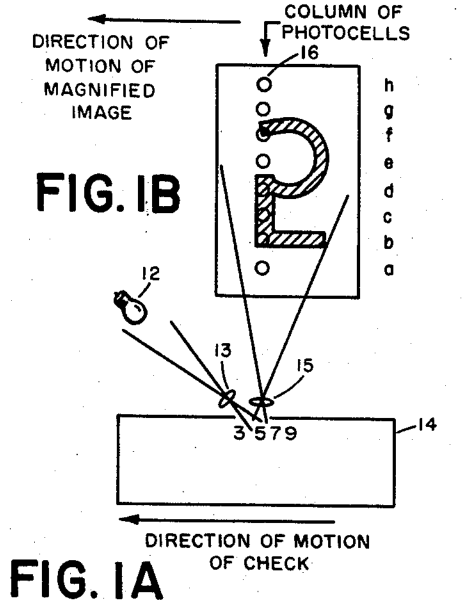
Figures 2A, 2B:
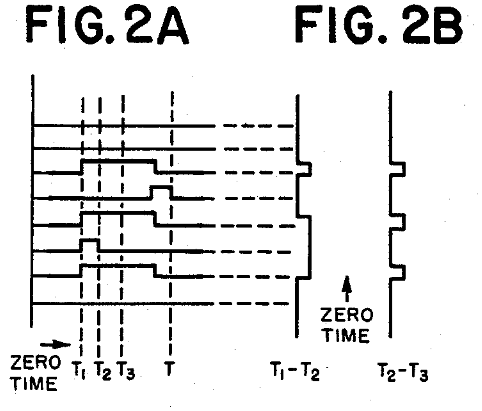

The photoelectric delay line scanner consists of a column of photocells whose outputs are modulated by the black portions of characters as they pass under the column. The cells are sequentially gated into a common buffer. Referring to Fig. 1A, a light source 12 is condensed by lens 13 to illuminate brightly a region of the check 14; for example, the region occupied by the numeral 5. Lens 15 projects a magnified image of the number on the column of photocells 16. The check 14 and the magnified image of the number are moving from right to left. However, for the purpose of illustration Fig. 1B shows the magnified image cast upon the column of photocells at the instant when the leading edge of the numeral 5 is under the scanning station. Fig. 2A shows the outputs of the photocells *a* through *h* from time $T_1$ when the number first enters the column of photocells through time T when the number has just departed from the photocells. The effect of sequentially gating the outputs of the photocells into a common buffer is shown in Fig. 2B. Scanning the photocells once between times $T_1$ and $T_2$ gives rise to a waveform showing two black regions (one long and one short). Scanning the photocells once between times $T_2$ and $T_3$ gives a waveform which exhibits three short pulses, each corresponding to one of the three short black regions in this part of the numeral five. Although the illustration treats the number for only two scans it must be realized that the number is actually scanned many more times. The contents of each scan of the number are now treated to determine two things: One, the total number of pulses during a scan, and two, the number of long black pulses during a scan. Referring again to Fig. 2B, the scan between times $T_1$ and $T_2$ yields a total of two pulses, one of which is long black, and the scan between time $T_2$ and $T_3$ yields a total of three pulses, none of which are long black.

Before continuing the description of the character reader the terms "gate" and "buffer" will be defined. An electronic gate, designated G, is a circuit having a single output and two or more inputs. A signal appears at the output only when there are signals on all the inputs. The gate is also known as a "logical and" circuit. (There is an output signal only when there is a signal on input one and on input two and on input three, etc.) An electronic buffer, designated B, is a circuit having a single output and two or more inputs. A signal appears at the output when there is a signal on any one, or more than one, of the inputs. The buffer is also known as a "logical inclusive or" circuit. (There is an output signal when there is a signal on input one or input two or input three, etc.)

Figure 3:
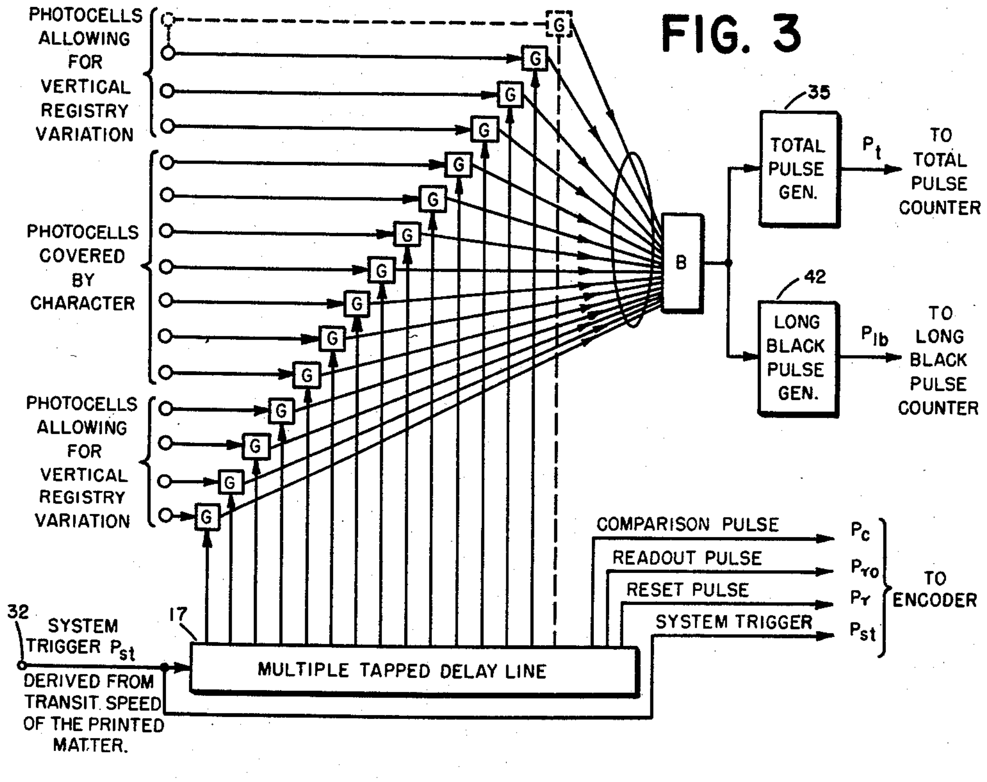
Fig. 3 is a detailed block diagram of the scanning station.

Fig. 3 is a detailed block diagram of the scanning station. Note that there are photocells both above and below those required to actually cover the number in order to accommodate changes in the vertical registry of the magnified image on the cells. The dotted lines associated with the top photocell are employed to indicate that any number of photocells may be used in the embodiment illustrated. Each photocell is an input to a gate whose other input is connected to an individual tap of a multiple tapped delay line 17. The outputs of the gates are then combined in the common buffer B. Each photocell is individually connected to buffer B by sending a single pulse (or signal) down the multiple tapped delay line. At any single time, this pulse appears at only one of the delay line taps and the gate to which this tap is connected is at that time allowed to pass the signal characteristic of its associated photocell input to the buffer B. A pulse sent down the delay line corresponds to a scan. If ten scans are sufficient to identify a character, then 10 pulses equally spaced in time are sent down the delay line during the period of time between entry and exit of the character under the column of photocells. In actual practice the input pulses (called the system trigger) are generated continuously at a repetition rate (scan rate) determined by the number of scans necessary to identify the most complex character. The scan rate is also slaved to the speed with which documents pass under the reading station so as to render the character reader independent of document speed.

No attempt is made to synchronize the start of a scan with respect to the entry of a character under the column of photocells. The effect of this non-synchronous operation can be seen by referring back to Fig. 1B. Although the tapped delay line 17 is connected in time sequence to cells *a* through *h* in that order there is no guarantee that cell "*a*" will be gated through at the same instant that the five appears as drawn. For example, if at this instant of time the cell "*a*" gate is open the first scan will consist of a long pulse (formed from cells *b, c, d*) followed by a short pulse (formed from cell *f*); at the other extreme, if, at this instant, the cell "*f*" gate is open, the first scan consists of only a short pulse (formed from cell *f*); when one of the cell gates *b* through *e* are initially open the first scan content is intermediate to the described extremes. The uncertainty of the start of the scan with respect to the edge of the character to be scanned illustrates the horizontal registry problem. The character reader overcomes this registry problem by utilizing the first scan not to recognize the character but to tell the recognition (interrogation) circuit to look for recognition of the next (or second) scan since on this second scan the previous uncertainty no longer exists.

The wave forms at the output of the combining network, buffer B, appear as in Fig. 2B. The total pulse generator 35 generates one pulse for each black region of the number and serves as a noise filter in that an input pulse must exceed a predetermined width in order for an output pulse to be generated. The long black pulse generator 42 is also a pulse width detector and in this case a pulse must exceed a greater predetermined width in order for a long black pulse to be generated. For example, a pulse must equal or exceed the long pulse width shown in Fig. 2B in order for a pulse to be generated by the long black pulse generator 42. The output of total pulse generator 35 and of long black pulse generator 42, along with the system trigger, are next sent to the encoder unit, described below. Three pulses, each appearing once during every scan period, are derived from the tapped delay line and also sent to the encoder. These pulses in the order of their time sequence are called the comparison pulse, the readout pulse, and the reset pulse. The function of each pulse will be discussed in connection with the description of apparatus energized thereby.

Figure 5:
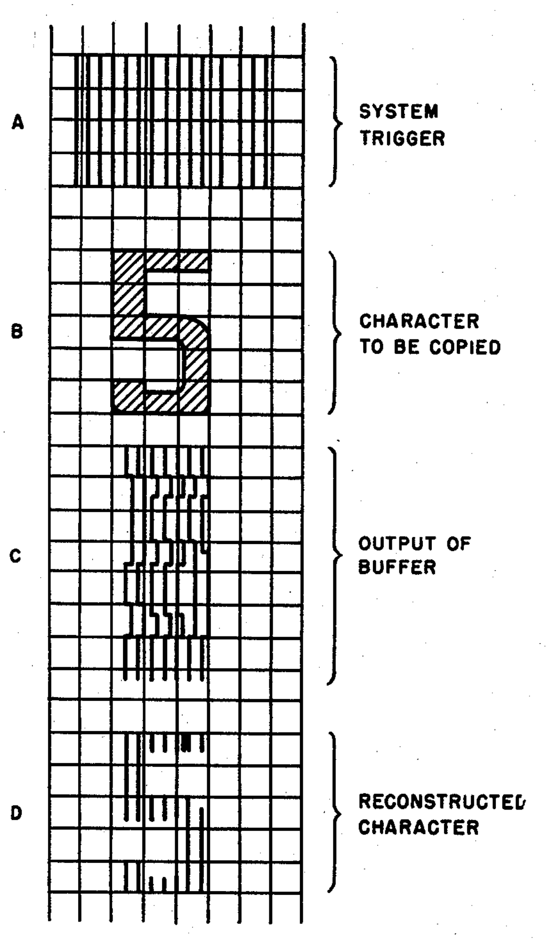
Fig. 5 illustrates the image viewed on an oscilloscope screen when the numeral 5 is scanned at intervals determined by the illustrated system trigger, and the buffer B output of Fig. 1 is coupled to the vertical deflection plates of an oscilloscope.

Before proceeding to the description of how the reader encodes and recognizes characters, it can be shown that the photoelectric scanner is in effect a copying or camera type device (capable of very high speed operation). The waveforms in Fig. 2B are typical of those appearing at the output of the buffer B of the photoelectric scanner, Fig. 3. If the system trigger (Fig. 5A) is connected to the vertical amplifier of an oscilloscope and if the output (Fig. 5C) of the buffer B is used to modulate the oscilloscope beam intensity, one would observe the picture shown in Fig. 5D when the numeral 5 of Fig. 5B is scanned.

Figure 4:
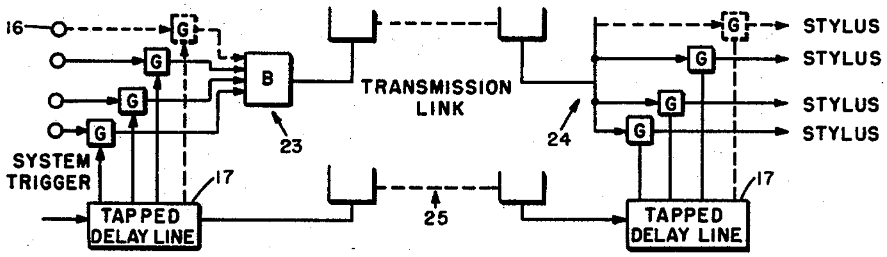
Fig. 4 illustrates in simplified block diagram form apparatus for printing the scanned character.

Referring to Fig. 4, an arrangement is illustrated to adapt the scanner of Fig. 3 for use with a printing device whereby the gates and delay line 17 at the sending end 23 are duplicated at the receiving end 24, and the outputs of the receiving gates used to operate printing styli. Sending end 23 is coupled to receiving end 24 by a suitable transmission link 25, such as direct wires or a radio carrier suitably modulated and demodulated.

The scanner is insensitive to ambient light from either tungsten or fluorescent sources and therefore, does not require elaborate light shielding. The photocells are preferably of the germanium junction type which have maximum response in the infrared.

The following six instructions constitute one example of a program for a particular embodiment of the character reader. This program is the heart of the particular reader described and will be frequently referred to hereafter.

(1) Count the total number of black pulses per scan regardless of whether the pulses are long or short.

(2) Count the number of long black pulses per scan.

(3) Combine the results of Steps 1 and 2 in certain discrete combinations; for example:

| Total Pulses Per Scan | Long Black Pulses Per Scan | Coded Combination |
|---|---|---|
| 1 | 0 | 10 |
| 1 | 1 | 11 |
| 2 | 0 | 20 |
| 2 | 1 | 21} 21′ |
| 2 | 2 | 22} 21′ |
| 3 | 0 | 30} 30′ |
| 3 | 1 | 31} 30′ |

Note that the first digit of the coded combination represents the total number of black pulses per scan and the second digit represents the number of long black pulses per scan.

(4) If adjacent scans are not identical, put the most recent scan, that is, its code combination, into shift register storage and shift the register.

(5) If adjacent scans are identical, put nothing into storage and do not shift the register. There are two exceptions:

(*a*) When the first two scans of the number are identical, put both scans into storage and shift the register for each scan.

(*b*) When the stored data is ready to be interrogated, advance the register regardless of scan-to-scan identity.

(6) When there is no character under the reading station, advance the register, but put nothing into storage.

The manner in which the foregoing instructions are carried out will be described with reference to the detailed block diagram of the encoding unit illustrated in Fig. 6. The system trigger, applied at terminal 32, operates electronic switch 33 which routes the total pulses, $P_t$, applied at terminal 34 from total pulse generator 35 of Fig. 3 alternately into total pulse counter A 36 and total pulse counter B 37 through gates $G_a$. The electronic switch 33 also routes the long black pulses, $P_{lb}$, applied at terminal 41 from long black pulse generator 42 of Fig. 3 into long black counter A 43 and long black counter B 44, alternately, through gates $G_b$. The four counters are conventional binary devices with their plates so connected that for the counter in the reset condition (zero count) one and only one of the four output wires is positive. Similarly for one, two, or three counts, only the one or the two or the three wire is positive.

The device of alternately switching the input information $P_t$ and $P_{1b}$ into pairs of identical counters provides the means for comparing adjacent scans for identity as required in instruction 4. The counters serve as relatively short term storage devices by holding the input information until they are reset by the reset pulse, $P_r$, applied at terminal 45 from delay line 17 of Fig. 3, which is electronically switched once each scan to alternately reset the A and B counters. A typical counter cycle is as follows. Information is read into the A counters on the first scan and the A and B counters are compared for identity. After this comparison, and before the next scan, the B counters are reset or cleared. On the next scan the information is read into the B counters, the A and B counters are compared and at the end of this scan the A counters are reset. The comparison is accomplished in the group of gates $G_d$ once each scan after the counters have received their input information and at a time determined by the comparison pulse $P_c$, applied at terminal 46 from delay line 17. One of the six comparison gates will respond only when the input data $P_t$ and $P_{1b}$ have remained constant from one scan to the next. Scan-to-scan identity in the long black counters 43 and 44 allows the comparison pulse to appear at the output of the buffer $B_{d1}$. Scan-to-scan identity in the total pulse counters 36 and 37 allows the comparison pulse to appear in the output of the buffer stage $B_{dt}$. A pulse appears at the output of both of the buffer stages only when scan-to-scan identity is indicated by both the total pulse and the long black counters. This is the necessary condition to pass the signal through gate $G_e$ to the identity gate generator 47. (The third input to gate $G_e$ which controls the generation of the identity gate is necessary to comply with instruction 5*a* and will be described later.) After the A and B counters have been compared for identity, they are read out by means of the read out pulse, $P_{ro}$, derived from delay line 17 for application at terminal 51. If there has been no identity the output of gate generator 47 remains positive and the read out pulse appears at the output of the gate $G_h$. The electronic switch 33 then allows the read out pulse to appear alternately at the input of the $G_g$ gates whereupon it enables the outputs of either the A or the B counters (whichever one the electronic switch 33 has allowed the input data to enter) to appear at the outputs of the appropriate $G_f$ gates. The $B_j$ buffers then show the accumulated count per scan independent of whether the counts appear in the A counters or the B counters. To comply with instruction 5*a* the first scan of the character is detected in buffer $B_k$ and used to generate an inhibiting signal whose duration is substantially 1½ scan periods in gate generator 49. It is this inhibiting signal applied to gate $G_e$ that prevents the recognition of an identity on the first two scans of the character. Subsequent scans of the character are prevented from generating additional inhibiting gates by the substantially 1½ character period gate generator 48 applied to gate $G_1$ to disable the latter for the duration of scanning the numeral. The symbols $n+$ (normally positive) appearing on the output lines of generators 48 and 49 refer to the polarity thereon when the associated generators are in the quiescent state.

Up to this point instructions 1 and 2 have been carried out by the total pulse counters and the long black counters respectively. Instruction 4 is partially satisfied in that adjacent scans have been checked for identity and the most recent scan is available for further use at the output of the $B_j$ buffers. Also, instruction 5(*a*) has been partially carried out in that the first two scans of the number are available for storage.

The combination of the total pulse and long black counters into coded numbers, required in instruction 3, are formed by the $G_m$ gates. The coded numbers 10, 30, 11, and coded combinations 30′ and 21′ are available at the outputs of the $G_m$ gates. (It must be remembered that only one, or none, of these 5 coded signals can appear during one scan.) The significance of the prime designation is that a coded number 31 or 30 results in a 30′ signal and a coded number 21 or 22 results in a 21′ signal. The prime combinations are obtained in the $B_m$ buffers.

The instruction "put into storage" is accomplished implicitly whenever a signal appears on one of the five coded signal lines. The storage register is shifted, or advanced, by the system trigger, $P_{st}$, when the trigger is enabled to appear at the output of gate $G_n$ for energizing shift register drive 58. $P_{st}$ appears, and the register is enabled to advance when a permissive signal appears on either one of the two inputs to the $B_p$ buffer. One input is energized by identity gate generator 47 and allows the register to shift unless there is an identity. Compliance with instruction 4 is now complete. The connection of the identity gate as an input to $B_p$ also complies with instruction six since between characters the outputs of both the total pulse counter and the long black counter are zero. This combination of 00 is not sensed for identity in the $G_d$ gates; therefore, no identity signal can be generated. Also, since the coded number 00 has not been explicitly formed in the $G_m$ gates there is nothing to put into storage. Permissive use of the lack of the identity signal for advancing the register also yields complete compliance with instruction 5*a* since the generation of the identity gate is inhibited on the first two scans by gate $G_e$ as described above. The one remaining instruction is that of 5*b*. Readiness for interrogation is detected in buffer $B_o$ which is connected to the 7th and last stage of storage. The first signal at the output of $B_o$, in response to the coded signal derived from the first scan being shifted out of the last row of shift register 56, passes through gate $G_o$ and is used to energize gate generator 52 which provides a gate whose duration is substantially 1½ scan periods. This gate connected to $B_p$ enables the register to advance on the next system trigger. Subsequent signals at the output of $B_o$ during the character storage time are prevented from passing through gate $G_o$ by the substantially 1½ character period gate generator 53, the latter being energized by the system trigger that occurs after the first output signal at $B_o$. This particular system trigger is broadened in the matrix interrogation pulse generator 54 and is then used in the diode matrix 55.

The operation of the shift register storage 56 will be better understood with the aid of Fig. 7. Each small block therein represents one magnetic core in the preferred embodiment, it being understood that other binary storage elements may be similarly arranged to provide equivalent results. Thus, there are a total of 35 cores arranged in 5 columns of seven each. Each of the five columns is used to store one of the five discrete coded numbers: 10, 11, 20, and coded combinations 21′ and 30′.

The nature of the register is such that information is always read-in to core row 1 and remains in row 1 until a shift signal is applied whereupon the entire content of row 1 is advanced to row 2. In advancing the information from row 1 to row 2 the shift signal, in effect, erases the content of row 1. The next shift signal advances the contents of row 2 to row 3, erasing rows 1 and 2, and advancing the content (if any) of row 1 to row 2. The same process continues for subsequent read-ins and shift signals. It should be borne in mind that one has access to the information in the cores only during the shift pulse time. Further, as indicated in Fig. 7, a single shift signal suffices to advance all 35 cores at once, and information previously read in to any or all of the cores is available at those cores during the time of the shift signal.

The manner in which the shift register is used as a part of the character reader will be explained with the aid of Figs. 8 and 9. Fig. 8 illustrates the scanned character "three." Note that the total number of pulses (T) in scan one is one and that there are no long pulses (L); i.e., code 10. For scan two $T=2$, $L=0$ for code 20; scans three, four, and five also yield code 20; in scans 6 and 7, $T=3$, $L=0$ for code 30; scan eight contains only one pulse and it is long (code 11). During scans 9 through 12 there is nothing under the reading station, $T=0$, $L=0$, and no code exists for this combination. The contents of this paragraph are tabulated in columns 1 through 4 of the chart of Fig. 9. The remainder of the columns show how the coded data gets into storage and is advanced to a known position in storage.

Column 5 shows whether or not the coded numbers of adjacent scans are identical. Note that although scans 9, 10, 11, and 12 are similar to the naked eye the encoder does not indicate identity because it does not explicitly sense for the 00 combination. This is the significance of the 4 dash marks at the bottom of column 4. Column 6 indicates that information is read-in to the shift register only on scans 1, 2, 6, and 8. Referring to column 4, information is read into the core columns that store 10, 20, 30′, and 11, and in that time sequence. Column 7 shows that the register is advanced whenever there is no scan-to-scan identity (column 5). Column 9 shows how the first bit of information (code 10) read-in to the register progresses from the first to the seventh row of cores, and then out of the cores (denoted by the symbol X57 in Fig. 7). Columns 10, 11, and 12 show that the subsequent read-ins (codes 20, 30, and 11) will occupy core rows 6, 5, and 4 respectively at the time the first read-in is at core row 7. When the first read-in has been shifted out of the cores, codes 20, 30′, and 11 occupy rows 7, 6, and 5 respectively indicated by the boxes containing the symbol X. The symbols X, then represent the positions in storage of the four code combinations that result from scanning the figure three, in accordance with the basic instructions built into the character reader, at the time the interrogation pulse appears to check which character has passed under the reading station. The signal derived from the first scan shifting out of the register signifies to the reader that the scanned character has now been read-in to a known position in storage and that the register must be interrogated for recognition on the next system trigger.

The shift register storage system then effectively serves as a relatively long term temporary storage device for retaining coded signals characteristic of the symbol then scanned and ejecting the signals after symbol recognition in preparation for accommodating the coded signals related to the next symbol to be scanned.

As mentioned above, the basic concept of the invention contemplates storing information obtained from a signal derived from a scan for interpretation only when said signal bears a predetermined relationship to another scan or other scans of the symbol. The particular example described in detail herein, relates to a program whereby storage for interpretation depends on non-identity with the preceding scan. However, it is evident that other programs might be instituted with storage for interpretation dependent on one or more following scans, a plurality of preceding scans, or combinations of preceding and following scans.

For example, the condition for storage of a coded number derived from a scan might be that there must be two identical scans before a code is put into storage, with subsequent adjacent identical scans not going into storage. Adhering to this program, and looking again at Fig. 8, the scans used for recognition would be scan 3 (because it is same as 2), not scans 4 and 5 (because they are same as 3), and scan 7 (because it is the same as 6).

Comparison with the table of Fig. 9 reveals that this program results in only two coded numbers entering storage when the numeral three is scanned whereas comparison with a single preceding scan resulted in four coded numbers being stored when scanning the three in the same manner; hence, storage elements and circuitry associated therewith may be reduced. Furthermore, the instructions for implementing this multiple comparison program implicitly reject consideration of the coded number derived from the ambiguous first scan. Still another advantage is that this multiple comparison program utilizes an integrative effect which enhances the insensitivity of the reader to dust particles and other noise-introducing elements.

It is now appropriate to list explicitly several salient features of this novel type of storage when programmed by the basic character reader instructions herein disclosed.

(*a*) The number of rows of storage are independent of the number of times that the character is scanned.

(*b*) The first scan that goes into storage is not used to recognize the character but only to ready the identification circuit. This overcomes the first scan uncertainty that would otherwise cause sensitivity to horizontal registry.

(*c*) The absolute time concept associated with the scanning of the character is not retained; therefore, recognition of the character is independent of the vertical size thereof.

(*d*) The coded scans are always shifted to a precisely known position in the storage register.

(*e*) Interrogation of the register (through the diode matrix 55 which is explained below) occurs only once, when the scan positions are known, to prevent coded stored characters from looking alike at times following interrogation when the store is being emptied.

(*f*) The exclusion from storage of identical adjacent scans renders the apparatus insensitive to variations in character width.

Implicit in the foregoing statement is the fact that apparatus, set up for maximum expected character velocity relative to the scanning station, will recognize at any lower speed, since reducing the speed of a symbol passing under the scanner effectively makes it wider; i.e., it is under the scanning station for a longer period of time.

Having described the means by which the encoded information related to a scanned character is positioned in storage, it is proper to consider a means for interpreting the stored coded signals in the shift register storage system embodied in diode matrix 55, which employs a preferred method of comparing the encoded data in shift register 56 with permanently stored coded data characteristic of known characters, in order to identify the scanned character.

The diode matrix 55 indicated on the encoder block diagram of Fig. 6 is illustrated in detail in Fig. 10. The matrix consists of five groups of vertical lines, seven lines per group, which can be interlaced (horizontal lines) as many times as there are characters to be recognized. Each of the seven vertical lines per group is connected to one horizontal row of the shift register cores.

The coded numbers or combinations characteristic of an expected character configuration, in a known position in the register, is inserted into permanent storage by connecting appropriate horizontal and vertical lines through gates and buffers. Take, for example, the numeral three whose sequence of coded numbers is 10, 20, 30, 11. When the coded number 10 is shifted out of the seventh row of cores the machine is instructed to interrogate the matrix at the time the next shift pulse occurs—and it is known that at this new time the 20 will be in the 7th row, the 30 in the 6th row, and the 11 in the 5th row. Referring now to horizontal line 61 in Fig. 10, gate 62 is energized along the first wire of the 20 register, the second wire of the 30 register, and the third wire of the 11 register. ("1st, 2nd, and 3rd wires" are synonymous to 1st, 2nd, and 3rd coded scans inserted into storage for recognition purposes). The final connection to gate 62 supplies the interrogation pulse applied on terminal 63. Note that the first coded scan, 10 is not used to recognize the number but only to instruct the reader that it is time to interrogate the matrix. Nor is the initial coded scan, whatsoever it may be, ever used for recognition. The resulting ambiguity always precludes the use of the first scan for recognition and indeed one of the factors that renders the reader insensitive to horizontal registry is this non-recognition use of the initial coded scan. The output of gate 62 is called the three wire and its significance is that whenever the reader recognizes the number three a pulse appears on this, and only this, line. The pulse on terminal 68 then operates the terminal equipment, for example, a sorter, a printer, an accumulator, etc.

Horizontal group 64 represents a more general case where a number can be represented by two sequences of coded signals. In this case recognition of the character yields a pulse at the output of either one of the two gates 65 and the buffer stage 66 combines the two possible output lines to a single line.

The remaining horizontal wires are shown to indicate that the reader will recognize the remaining nine decimal digits there shown. However, it is apparent that the apparatus need not be limited to numeral recognition. In accordance with the principles herein disclosed, appropriate connections between the shift register storage 56 and diode matrix 55 adapts the reader to recognize any symbol.

The character reader is also able to resolve ambiguous number sequences by means of simple logical decisions. For example, both physically and in storage, the numeral zero completely overlaps the numeral one (referenced to the left edge of either number) since the entire body of the one and the beginning of the zero are both long straight lines. The converse, however, is not true: the one obviously does not completely overlap the zero. Referring to Fig. 10, this means that when a zero is scanned by the reader a pulse will appear on the zero wire and at the output of gate 67 (horizontal lines 71 and 72). However, when a one is scanned a pulse appears only at the gate 67 output. The character reader resolves this situation by making the following logical decision: When a pulse appears on both the zero wire and at the output of gate 67 the input can only be a zero and the pulse should be inhibited from appearing on the one wire. This is accomplished in Fig. 10 by the inhibit gate 73 connected between the output of the one gate 67 and the one terminal 69 which precludes terminal 69 from being energized simultaneously with the zero terminal 79. An extension of the principle of logical decisions is the basis of the following general statement: A character, positively identified, can never be mistaken for any other character.

Referring to Fig. 11 there is illustrated a schematic circuit diagram of a typical gate circuit suitable for use in the embodiment described above. Positive pulses applied simultaneously to input terminals 81 enable output terminal 83 to rise for the simultaneous duration of the two pulses. Additional diodes 82 may be connected in the manner shown so that simultaneous energization of three or more input terminals is required to provide an output pulse on terminal 83.

Referring to Fig. 12, a schematic circuit diagram of a typical buffer suitable for use in the previously described embodiment of the invention is illustrated. In the quiescent state input terminals 84 and 95 are maintained at the same quiescent potential so that both diodes are conducting, thereby maintaining output terminal 88 at substantially quiescent potential. Application of a positive pulse to input terminal 84 induces output terminal 88 to rise to the new potential. In a similar manner, a positive pulse applied only to terminal 85 produces a corresponding output pulse on terminal 88. If both terminals 84 and 85 are energized simultaneously, again an output pulse is provided on terminal 88. Additional diodes may be added in parallel with diodes 86 and 87 to provide additional input terminals, energization of any one input terminal being effective in providing an output pulse on terminal 88.

Referring to Fig. 13, a block diagram of apparatus suitable for both pulse and long black pulse generators is illustrated. An input pulse is applied at terminal 91 to delay line 92 and gate 93. The other input of gate 93 is the output of delay line 92, which introduces a delay substantially equal to the minimum duration of the pulse to be detected. If a pulse applied at terminal 91 exceeds this duration, there is a period of time when both inputs to gate 93 are simultaneously energized; hence, an output pulse appears on terminal 94. Of course, the delay introduced by delay line 92 when the circuit of Fig. 13 is employed as long black pulse generator 42 of Fig. 3 is substantially greater than the delay introduced when operating as total pulse generator 35.

Included in the advantages which obtain from embodying the novel techniques herein disclosed are:

(*a*) Independence of the width of the number. If the three was twice as wide as indicated, it would be scanned sixteen rather than eight times. There would, however, still be only four code combinations that would result from the scanning and these would be the same combinations that resulted from the smaller number: 10, 20, 30, 11. Further, the code would occupy the same position in storage in spite of the fact that with the wider character twice as much time would elapse between the insertion into storage of the first and the last coded scan.

(*b*) Independence of horizontal registry. Horizontal registry is defined as the lateral position of the number with respect to the reading head (or the scanning lines). For example, if the number in Fig. 7 is slipped slightly to the right, leaving the scan lines stationary, the coded number derived from the initial scan will be 20 instead of 10. The uncertainty of the content of the first scan is so great (for all characters) that it is not used to identify the characters. (The first scan is, however, used to program the interrogation of the core matrix as was described previously). Note also that slipping the three slightly to the right will change the coded number derived from the sixth scan from 30 to 20. To fully appreciate the effect of this registry the coded scans are given below:

| Scan | 1 | 2 | 3 | 4 | 5 | 6 | 7 | 8 | 9 | 10 | 11 |
|---|---|---|---|---|---|---|---|---|---|---|---|
| As in Fig. 8 | 10 | 20 | 20 | 20 | 20 | 30 | 30 | 11 | ---- | ---- | ---- |
| Slipped to right in Fig. 8 | ---- | 20 | 20 | 20 | 20 | 20 | 30 | 11 | ---- | ---- | ---- |

In both of the above cases, however, because of the way the reader is instructed to store and handle information the stored code at interrogation time reduces to 20, 30, 11, and occupies the 7th, 6th and 5th rows of cores respectively. The interrogated code remains 20, 30, 11 even if the left edge of the three is mutilated and if the central region giving the 30 is almost entirely missing.

(*c*) Independent of vertical registry. Vertical registry is defined as the vertical position of the number with respect to the photoelectric scanner. This independence is true so long as the magnified image of the printed character to be read is cast upon the column of photocells in the scanner (see Figs. 1 and 3).

(*d*) Largely independent of the speed with which the characters are passed beneath the reading station. At the specified operating rate of the reader there is no speed limitation. If the speed was to be increased indefinitely the limitations would be caused by components, i.e., photocells, shift registers, etc., rather than the operating instructions.

It also appears that it is not necessary to slave the scanning frequency to the document speed as long as a certain minimum scan rate is maintained. This follows since slowing down the printed matter effectively makes it wider with respect to the scan rate. This effect was covered above in paragraph *b*. If speed and scan frequency are not slaved, gate generators are changed from one shot multivibrator devices to counting devices, and the diode memory matrix is enlarged.

(*e*) Largely independent of the height of the symbol once the machine is set up for minimum expected height. Referring to Fig. 8, it is seen that if the height is doubled the code put into storage remains 10, 20, 30, 11. The long pulse occurring on the eighth scan to yield code 11 would now be twice as long. However, the characteristic of the long black pulse generator is such as to give an output pulse for any input pulse whose duration exceeds a given value.

(*f*) Quality of printed impression. The character reader is insensitive to imperfections that are present at the beginning and end of a number. It will also recognize characters having certain imperfections within the body of the character since the reader treats its input data without depending on the absolute time sequence of this data.

(*g*) No elaborate precautions are necessary for shielding the reader from ambient light. This is because the printed documents to be read are illuminated with an intense light source. Further, since the photocells used in the scanner have peak response in the infra-red there is no possibility of interference from fluorescent light fixtures.

The versatility of the character reader can be further extended by merely increasing the amount of data for handling in the encoder and in storage. The basic instructions for data handling would remain as stated. Examples of data implicit at the output of the scanner, but not explicitly extracted in the present reader are: long and short white content per scan, and the relative occurrence time of signal content per scan, i.e., the order of occurrence of black, white, long and short pulses.

A scanner of Fig. 1, in which light source 12 consisted of a projection bulb, photocells 16 were of the germanium-junction type, and lens 15 was an objective magnifying lens, supplied a scanning signal to associated apparatus constructed in the manner herein disclosed which reliably recognized all ten printed arabic numerals at the rate of 2000 per second. The symbols were in conventional gothic bold face type of minimum size ⅛ inch by 5⁄64 inch, having the ragged edges associated with many printed characters. The apparatus remained insensitive to paper imperfections, spots of dirt and the light intensity of the normally lit room.

The technique for numeral recognition and the apparatus therefor described in detail above is merely intended to serve as a specific example of an embodiment which applies the novel principles disclosed herein. It is apparent that one may make numerous modifications in apparatus and departures from the instructions and encoding methods without departing from the inventive concepts revealed above. Consequently, this invention is to be construed as limited only by the spirit and scope of the appended claims.

What is claimed is:

1. Apparatus for providing an output signal characteristic of a symbol composed of a plurality of contrasting media comprising, means for scanning portions of said symbol to provide a scanning-derived signal characteristic of the size and number of areas of said contrasting media in the scanned portion, means for interpreting said scanning-derived signal to derive for each portion scanned a portion coded number signal representative of a coded number having a digit for each of a predetermined plurality of size classifications of selected contrasting media, said digit being characteristic of the number of the associated size classification of the contrasting medium represented thereby, means for storing said portion coded number signal when it bears a predetermined relation to one or more coded number signals derived from one or more other portions, and means for interpreting the sequence of stored coded number signals to derive an output signal uniquely characteristic of the symbol then scanned.

2. Symbol recognition apparatus comprising means for scanning portions of a symbol composed of shaded areas, means for deriving a signal having pulses characteristic of the number and size of shaded areas in the scanned portion, means for counting the pulses characteristic of a predetermined plurality of shades and sizes in each portion to derive a scan count, a storage system, means for inserting said scan count into said storage system only when it bears a predetermined relation to one or more other scan counts, and means for interpreting the scan counts in storage to derive a signal characteristic of the symbol then scanned.

3. Symbol recognition apparatus for providing a signal output uniquely characteristic of a symbol formed of areas of different shades comprising, means for scanning portions of said symbol to derive a signal characteristic of the shade of the scanned portion, means for storing the signals derived from selected scanned portions which have a predetermined relation to the signal derived from a previously scanned different portion, and means for interpreting the stored signals.

4. Symbol recognition apparatus for providing a signal output uniquely characteristic of a symbol formed of areas of different shades comprising, means for scanning portions of said symbol to derive a signal characteristic of the shade of the scanned portion, means for storing the signals derived from selected scanned portions which have a predetermined characteristic which is different from that of a signal derived on the previous scan of a different portion, and means for interpreting the stored signals.

5. Apparatus for providing an output signal uniquely characteristic of an inscribed symbol composed of light and dark areas comprising, means for successively scanning portions of said symbol, means for deriving a signal characteristic of the number of relatively large and the number of relatively small dark areas in a scanned portion, means for comparing one signal derived therefrom with one or more signals derived from other scans, means for storing the one signal only when it has a predetermined relationship to one or more signals compared therewith, and means for interpreting the stored signals.

6. Apparatus for providing an output signal uniquely characteristic of an inscribed symbol composed of light and dark areas comprising, means for successively scanning portions of said symbol, means for deriving a signal characteristic of the number of relatively large and the number of relatively small dark areas in a scanned portion, means for comparing one signal derived therefrom with another signal derived from the preceding scan, means for storing the one signal only when it characterizes a different number of relatively large and relatively small dark areas than characterized by said signal derived from the preceding scan, and means for interpreting the stored signals.

7. Apparatus for providing an output signal uniquely characteristic of an inscribed symbol composed of light and dark areas comprising, means for successively scanning portions of said symbol to derive a signal characteristic of the number of dark areas in a scanned portion and the number of relatively large dark areas therein, means for comparing one signal derived therefrom with another signal derived from an earlier scan, means for storing the one signal only when it has a predetermined relationship to the other signal, and means for interpreting the stored signals.

8. In a symbol recognition system for providing a signal output characteristic of an inscribed symbol formed of light and dark areas, apparatus comprising, means for scanning portions of said symbol to derive a signal characteristic of the number and size of dark areas in the scanned portion, a relatively short term storage device which stores a first signal derived from scanning one portion of said symbol for comparison with a second scanning derived signal related to a later scan of another portion, and a relatively long term storage device to which said second signal is transferred when it has a predetermined relation to said first scanning-derived signal.

9. Symbol recognition apparatus for providing a signal output uniquely characteristic of a symbol comprising, means for scanning portions of said symbol to derive a signal characteristic of the shade of the scanned portion, means for storing the signals derived from selected scanned portions which have a predetermined relation to the signal derived from one or more other scanned portions, and means for interpreting the stored signals.

10. Apparatus for providing an output signal uniquely characteristic of a printed symbol composed of light and dark areas comprising, means for successively scanning portions of said symbol, means for deriving a signal charactertistic of the number of relatively large and the number of relatively small dark areas in a scanned portion, means for comparing one signal derived therefrom with another signal derived from an earlier scan, means for storing the one signal only when it has a predetermined relationship to the other signal, and means for interpreting the stored signals.

11. Apparatus for providing a signal output characteristic of a printed symbol composed of light and dark areas comprising, means for sequentially scanning adjacent portions of said symbol to derive a signal characteristic of the number of relatively large and the number of relatively small dark areas in a scanned portion, means for comparing the signals derived from scanning adjacent portions, means for storing a derived signal only when the number of relatively large or the number of relatively small dark areas in the scanned portion differs from the respective numbers in the previously scanned adjacent portion, and means for interpreting the stored signals.

12. In a symbol recognition system for providing a signal output characteristic of a symbol apparatus comprising, means for scanning portions of said symbol to derive a signal characteristic of the scanned portion, a relatively short term storage device for storing one signal derived from scanning one portion of said symbol, and a relatively long term storage device to which the one signal is transferred when it has a predetermined relation to another signal derived from scanning another portion of said symbol.

13. Apparatus for encoding a symbol composed of light and dark areas which includes means for examining portions of said symbol, means for counting the number of relatively large and the number of relatively small dark areas in each portion, means for assigning for each portion a coded number signal having two digits, one characteristic of the number of relatively large dark areas, and the other characteristic of the number of relatively small dark areas, and means for retaining only those coded number signals which bear a predetermined relationship to one another.

14. Apparatus for recognizing an inscribed symbol formed of shaded areas comprising, means for scanning portions of said symbol to provide a scanning-derived signal which characterizes the size and number of said shaded areas in the scanned portion, an encoding unit for interpreting said scanning-derived signal to provide for each scanned portion a coded signal characteristic of the size and number of said shaded areas, means for comparing the coded signals from successive scans, a temporary store and means for inserting therein the coded signal derived from a scan only when it bears a predetermined relation to the coded signal derived from the preceding scan, thereby providing a temporary sequence of coded signals in said temporary store, a fixed store having therein for a plurality of known symbols, the sequence of coded signals for each known symbol which would obtain from scanning said known symbol in the manner aforesaid with respect to said inscribed symbol, means for comparing the known sequences of coded signals with said temporary sequence to obtain an identity with one of said known sequences, the known symbol corresponding thereto being recognized as said inscribed symbol.

15. Apparatus as in claim 14 wherein said scanning means includes a plurality of photocells, a source of system trigger pulses, a gate for each photocell energized by said photocell at one input and by said system trigger pulse delayed a different interval for each gate at the other input, thereby providing the gated output of only one of said photocells at any one instant of time, and means for imparting relative motion between said photocells and said symbol.

16. Apparatus for recognizing an identifiable symbol composed of dark and light areas which includes the steps of scanning adjacent segments of said symbol to provide a scanning-derived signal characteristic of the number and size of said dark areas, means for interpreting said scanning-derived signal to obtain a coded signal characteristic of the total number of dark areas in each segment and the number of relatively large dark areas therein, means for comparing the coded signals derived from successive scans and inserting a coded signal into a temporary store only when different from the coded signal of the preceding scan to retain therein a temporary coded sequence, and means for comparing said temporary coded sequence with a plurality of permanent coded sequences each characteristic of a known symbol, thereby deriving an identity signal when said temporary coded sequence is compared with the permanent coded sequence characteristic of said identifiable symbol.

17. Apparatus for recognizing an identifiable symbol composed of dark and light areas comprising, scanning means for sequentially scanning segments of said symbol to provide a scanning-derived signal characteristic of the number and size of said dark areas in the scanned segment, means for interpreting said scanning-derived signal to obtain for each scan a coded signal characteristic of the number of dark areas in the scanned segment and the number of relatively large dark areas therein, a comparator which provides an identity signal when the coded signals derived from successive scans are identical, a temporary storage system, an inhibiting gate generator energized by said identity signal which precludes insertion of a coded signal into temporary storage except when different from the coded signal derived on the preceding scan, thereby retaining a temporary coded sequence in said temporary storage, a fixed store having stored therein a plurality of permanent coded sequences each characteristic of a known symbol, means for comparing said temporary coded sequence with said permanent coded sequences to derive an identity signal when said temporary coded sequence is identical with the permanent coded sequence corresponding to said identifiable symbol, thereby recognizing said symbol.

18. Apparatus for recognizing a symbol composed of light and dark areas comprising, means for scanning adjacent parallel segments of said symbol to provide a scanning-derived signal characteristic of the size and number of the dark areas in each segment, means for deriving from said scanning signal a total pulse for each dark area in a segment and a long black pulse for each relatively large dark area therein, first and second total pulse counters energized on alternate scans by said total pulses to provide a total pulse count for each scan, first and second long black counters energized on alternate scans by said long black pulses to provide a long black pulse count for each scan, means for comparing the count of said first counters with the count of said second counters to derive an identity pulse only when the count in said first and second counters is identical from scan to scan, means for combining the counts in said first counters and in said second counters to derive first and second coded signals, a shift register storage system, means for inserting into said shift register storage system the more recently derived of said first and second coded signals except when said identity pulse precludes such storage, a diode matrix each output terminal thereof corresponding to a known symbol, means for interrogating said diode matrix after a predetermined number of coded signals have been inserted into storage while pulsing said shift register storage system to derive a symbol signal characteristic of the coded signals stored therein, and means for energizing said diode matrix with said symbol signal to provide an output pulse on the terminal of said diode matrix corresponding to the symbol scanned.

19. Apparatus as in claim 18 wherein said shift register storage system comprises binary storage elements arranged in a plurality of rows and columns, there being one column for each different coded signal expected, the insertion of said first or second coded signals into said shift register storage system being effective to transfer the information in a row into the next succeeding row, and interpretation of the coded signals in said shift register storage system is in response to the information characterized by the first insertion of a coded signal into storage being shifted from the last row.

20. Apparatus as in claim 19 wherein said diode matrix comprises a gate for each of said output terminals, each of said gates energized separately by those binary storage elements in said shift register storage system which contain the coded signals inserted therein corresponding to the symbol associated with the gate output terminal at the time said first coded signal inserted into said shift register is shifted from the last row, and said gates are energized jointly by an interrogation pulse generated shortly thereafter.

21. Apparatus as in claim 18 wherein said shift register storage system includes for each different expected coded signal, a shift register composed of serially connected binary storage elements, there being the same number of storage elements in each of said shift registers, means for energizing the shift register associated with the coded signal to be stored while simultaneously shifting all of said shift registers, and means for interpreting the coded signals in said shift register system in response to the coded signal which first entered said shift register storage system leaving the last element of its associated shift register.

22. Apparatus for recognizing an identifiable symbol composed of dark and light areas comprising, a scanner which includes a linear array of photocells, for each photocell a gate with one input energized by its associated photocell, a multiple tapped delay line with a tap for each photocell gate and having a comparison pulse output terminal, a readout pulse output terminal, a reset pulse output terminal, and energized with system triggers from a source of system trigger pulses, means for connecting adjacent taps on said delay line to the other input of photocell gates associated with adjacent photocells, a buffer energized by all the outputs of said photocell gates, means for imparting relative motion between said photocells and said identifiable symbol, said scanner scanning a segment of said symbol once per scan period and a symbol once per character period, a total pulse generator which provides an output pulse for each dark area scanned by said scanner, a long black pulse generator which provides an output pulse for each relatively large dark area scanned thereby, first and second total pulse counters and first and second long black pulse counters, said first and second counters non-coincidentally energized on alternate scans by said total pulse generator and said long black pulse generator, means for generating an identity pulse when the counts in said first and second counters are identical, an identity gate generator energized by said identity pulse to provide an inhibiting pulse, means for combining said counts in said first counters and the counts in said second counters to provide respectively first and second coded signals, means for combining said first and second coded signals to provide a final coded signal, means for precluding the generation of said inhibiting pulse for substantially one and one half scan periods after the first pulse detected from scanning said identifiable symbol, means for combining some of said final coded signals to provide coded combinations when any one of the final coded signals so combined is characteristic of an expected symbol, a code output terminal for each uncombined final coded signal and for each coded combination, a code output terminal being energized when said first or second counters hold the count associated therewith and there is an absence of an inhibiting pulse, a shift register for each of said code output terminals, said shift registers each comprising the same number of serially connected binary storage elements, means for inserting a binary bit into the first element of a shift register when its associated code output terminal is energized while simultaneously shifting all the registers, means for generating an interrogation pulse when the first information bit stored in said shift register storage system is shifted from the last element of its associated shift register, a matrix with an output terminal for each expected symbol, associated with each matrix output terminal a matrix gate energizing said terminals when all the inputs thereto are energized, means for energizing the input to said matrix gates with the output signal of the binary elements in said shift register storage system containing a coded information bit characteristic of the known symbol when said interrogation pulse is generated, means for jointly energizing the remaining input of said matrix gates with said interrogation pulse to provide a pulse on the matrix output terminal corresponding to said identifiable symbol.

23. In a symbol recognition system for deriving a signal characteristic of an inscribed symbol composed of light and dark areas, means for sequentially scanning adjacent segments of said inscribed symbol to provide a scanning-derived signal having a short pulse for each relatively small dark area in a scanned segment and a long black pulse for each relatively large dark area therein, encoding apparatus comprising, means for counting the combined total of said short and long pulses per scan to derive a total pulse count for each scan, means for counting the number of long pulses per scan to derive a long pulse count for each scan, means for combining said total and long pulse counts to derive a coded number for each scan characteristic of the number and size of the dark areas in the scanned segment, a shift register storage system, means for comparing the coded numbers of adjacent scans for identity, means for both shifting said register and inserting therein the coded number derived from the most recent scan when different from the coded number derived from the preceding or when said most recent scan is the second scan of said inscribed symbol, means for shifting said register when the coded numbers inserted into storage occupy a predetermined position in said shift register storage system characteristic of said inscribed symbol, and means for shifting said register when said scanning means scans a region having no dark areas.

24. Apparatus for providing a signal characteristic of a symbol composed of light and dark areas comprising a column of photocells, means for imparting relative motion between said photocells and symbol in a direction substantially perpendicular to said column, for each photocell a gate with one input thereof energized by its associated photocell, when said photocell is scanning a dark area, a source of system trigger pulses, a multiple tapped delay line with at least as many taps as photocells and an input terminal energized by said system trigger pulses for providing each system trigger pulse delayed by a different time interval on each tap, said interval dependent upon the distance traveled by the delayed pulse from said input terminal to a tap, means for connecting adjacent taps on said delay line to the other input of photocell gates associated with adjacent photocells, and a buffer energized jointly by the photocell gates to provide a buffer output signal having a black pulse for each dark area scanned whose duration is characteristic of the size thereof.

25. Apparatus as in claim 24 including a plurality of means for generating a pulse for each black pulse which exceeds a predetermined plurality of selected durations.

26. Apparatus as in claim 24 including means for generating a total pulse for each black pulse which exceeds a predetermined relatively short duration and means for generating a long black pulse for each black pulse which exceeds a predetermined relatively long duration.

27. Apparatus as in claim 24 including a light source, a first lens system for focusing the light rays of said light source on said symbol and a second lens system for focusing the image of said symbol on said photocells.

28. Apparatus for storing and interpreting coded data characteristic of an element of information comprising, a shift register storage system having a shift register for each different expected bit of coded data to be inserted therein, each of said shift registers having the same number of serially connected binary storage elements, means for inserting a coded bit into the shift register associated therewith while shifting the data stored in each binary storage element of said shift register into the next serially connected binary storage element, a store interpreting unit comprising a symbol output terminal for each expected element of information, at least one symbol gate for each element of information, means for connecting selected binary storage elements in said shift register storage system to an input of an associated symbol gate, said selected binary elements having stored therein a coded data bit characteristic of the information element associated with the symbol gate, means for energizing each symbol gate with an interrogation pulse derived in response to the first coded data bit which entered said shift register storage system exiting from the last storage element of its associated shift register to signify that the combination of coded data bits characteristic of an information element to be recognized occupies the binary storage elements connected to the symbol gate or gates associated with said symbol to provide an output pulse on the symbol output terminal associated with the information element to be recognized, for each expected information element which is characterized by any one of a plurality of coded combinations, a buffer energized by a symbol gate for each of said plurality of combinations, the output of said buffer energizing an associated symbol output terminal, and an inhibiting gate energized by first and second symbol gates for precluding appearance of an output pulse on the symbol terminal associated with said second symbol gate when said first and second symbol gates provide simultaneously an output pulse, and energizing the symbol output terminal associated with said second symbol gate when said second symbol gate alone provides an output pulse, thereby uniquely identifying a coded combination characteristic of one information element which is included in the combination of another.

29. Apparatus for encoding a variable signal representative of a plurality of contrasting media, comprising means for examining discrete portions of said signal, means for classifying said contrasting media represented by said signal portions into a plurality of size classifications, means for deriving a code for each signal portion representative of the contrasting media in each of said clasifications, and means for storing each code so derived only when it bears a predetermined relationship to the corresponding code derived from at least one other signal portion.

References Cited in the file of this patent

UNITED STATES PATENTS

| | | |
|---|---|---|
| 2,615,992 | Flory | Oct. 28, 1952 |
| 2,616,983 | Zworykin | Nov. 4, 1952 |

OTHER REFERENCES

Photoelectric Reader "Electronics," May 1955 (pp. 134 to 138).